(12) United States Patent  
Zhou

(10) Patent No.: US 8,023,040 B2  
(45) Date of Patent: Sep. 20, 2011

(54) ELECTRONIC DEVICE HAVING MULTIPLE CAMERA MODULES

(75) Inventor: Yu-Hui Zhou, Shenzhen (CN)

(73) Assignees: Shenzhen Futaihong Precision Industry Co., Ltd., ShenZhen, Guang Province (CN); FIH (Hong Kong) Limited, Kowloon (HK)

( * ) Notice: Subject to any disclaimer, the term of this patent is extended or adjusted under 35 U.S.C. 154(b) by 405 days.

(21) Appl. No.: 12/339,286

(22) Filed: Dec. 19, 2008

(65) Prior Publication Data

US 2010/0002129 A1     Jan. 7, 2010

(30) Foreign Application Priority Data

Jul. 4, 2008    (CN) .......................... 2008 1 0302544

(51) Int. Cl.  
*H04N 5/225*     (2006.01)  
*H04M 1/03*     (2006.01)

(52) U.S. Cl. .................... 348/376; 455/575.3; 455/575.4

(58) Field of Classification Search ................. 348/373, 348/376; 455/575.1, 575.3, 575.4  
See application file for complete search history.

(56) References Cited

U.S. PATENT DOCUMENTS

| | | | | |
|---|---|---|---|---|
| 7,280,857 | B2 * | 10/2007 | Geernaert | 455/575.4 |
| 7,450,173 | B2 * | 11/2008 | Im et al. | 348/376 |
| 7,581,893 | B2 * | 9/2009 | Miramontes | 396/448 |
| 7,836,554 | B2 * | 11/2010 | Fu | 16/362 |
| 7,925,310 | B2 * | 4/2011 | Chiu | 455/575.4 |
| 7,925,314 | B2 * | 4/2011 | Liao et al. | 455/575.3 |
| 2007/0087596 | A1 * | 4/2007 | Chung et al. | 439/131 |
| 2007/0279511 | A1 * | 12/2007 | Misawa | 348/333.06 |
| 2008/0004083 | A1 * | 1/2008 | Ohki et al. | 455/575.4 |
| 2008/0299804 | A1 * | 12/2008 | Ronkko et al. | 439/142 |
| 2009/0251585 | A1 * | 10/2009 | Joseph | 348/333.01 |

* cited by examiner

*Primary Examiner* — Jason Whipkey  
(74) *Attorney, Agent, or Firm* — Altis Law Group, Inc.

(57) ABSTRACT

An exemplary electronic device includes a lower housing having a mounting panel, a first camera module mounted to the mounting panel, a sliding member mounted to the lower housing, a second camera module mounted to the sliding member, and two hinge assemblies fixed to the sliding member. The first camera module is configured to be covered by the sliding member. The second camera module is configured to be covered by the mounting panel. The hinge assemblies are configured to make the sliding member slidable relative to the lower housing to expose the first camera module and the second camera module out from the sliding member and the mounting panel, respectively, and enable the sliding member rotatably relative to the lower housing.

18 Claims, 5 Drawing Sheets

ELECTRONIC DEVICE HAVING MULTIPLE CAMERA MODULES

BACKGROUND

1. Field of the Invention

The present embodiment relates to an electronic device having two or more camera modules.

2. Description of Related Art

Electronic devices (such as mobile phones) may incorporate two or more camera modules. The electronic device may use a first camera module for capturing images, and use a second camera module for video conferencing. The first and second camera modules are typically arranged on opposite sides of the electronic device. Thus, users can orient the first camera module towards a front object for imaging, simultaneously, positioning the second camera module facing the user for videoconferencing.

However, to prevent the first and second camera modules from damage and contaminants, the electronic device usually includes two protective caps to detachably cover the first and second camera modules. The protective caps are usually not permanently attached to the electronic device and therefore easily misplaced when detached.

Therefore, there is room for improvement within the art.

BRIEF DESCRIPTION OF THE DRAWINGS

Many aspects of the exemplary electronic device having multiple camera modules can be better understood with reference to the following drawings. These drawings are not necessarily drawn to scale, the emphasis instead being placed upon clearly illustrating the principles of the present electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
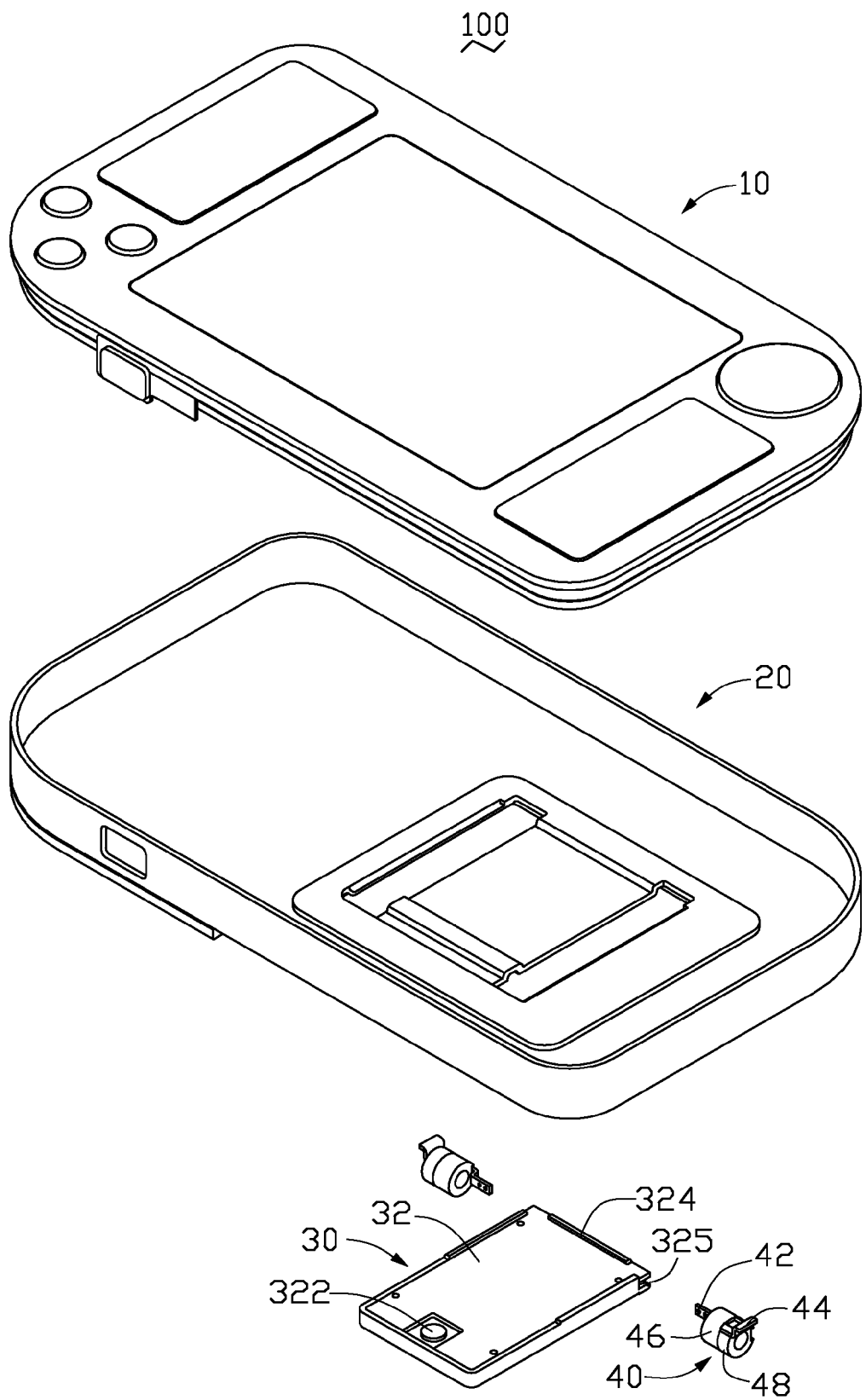
FIG. 1 is an isometric and exploded view of an electronic device using camera modules according to an exemplary embodiment.
Figure 2:
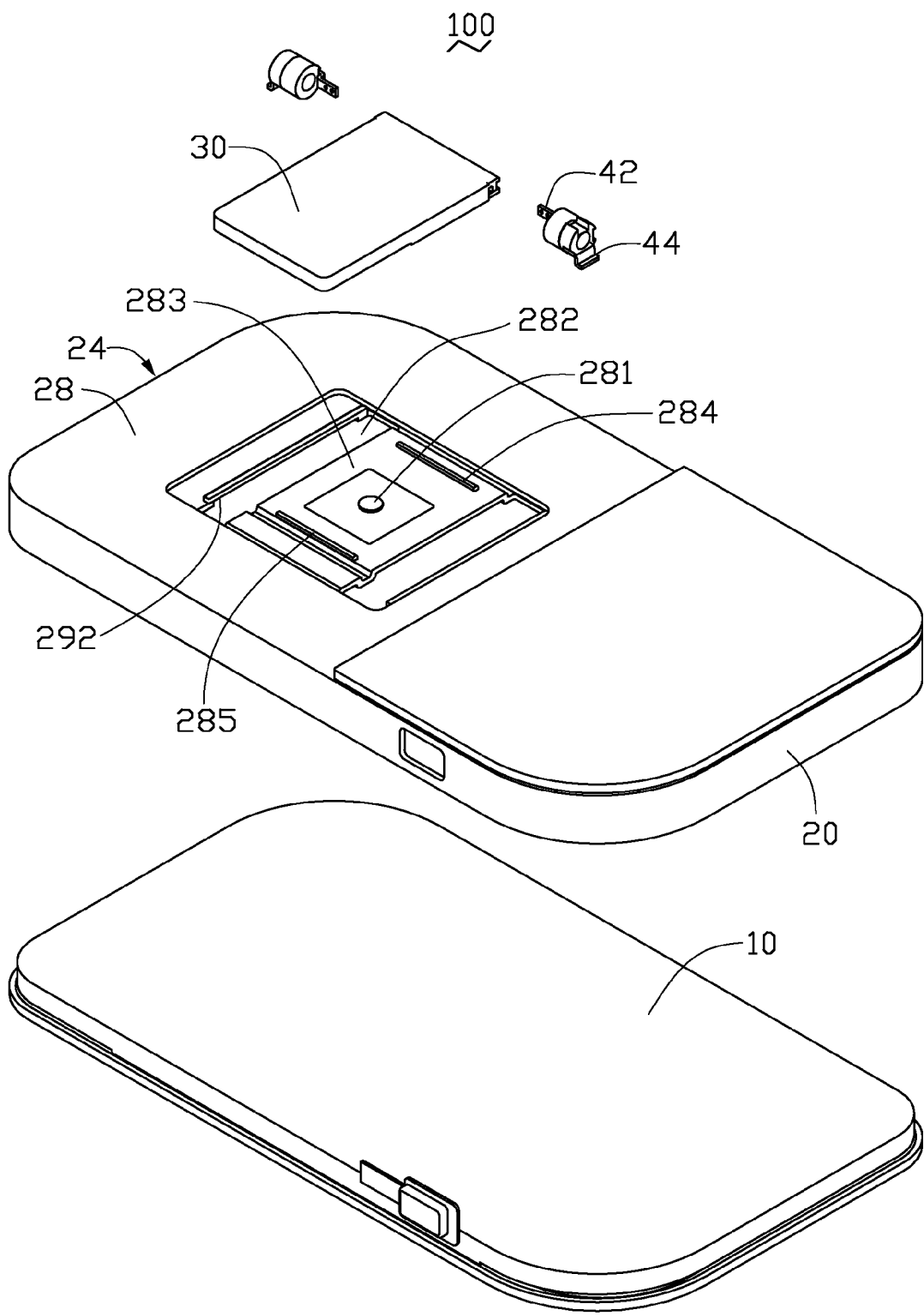
FIG. 2 is similar to FIG. 1, but showing another aspect.

FIGS. 1 and 2 show an exemplary electronic device 100 (e.g., a mobile phone) incorporating a plurality of camera modules, e.g., a first camera module 281 and a second camera module 322. The first camera module 281 and the second camera module 322 may all simultaneous be used for photography and video recording.

Figure 3:
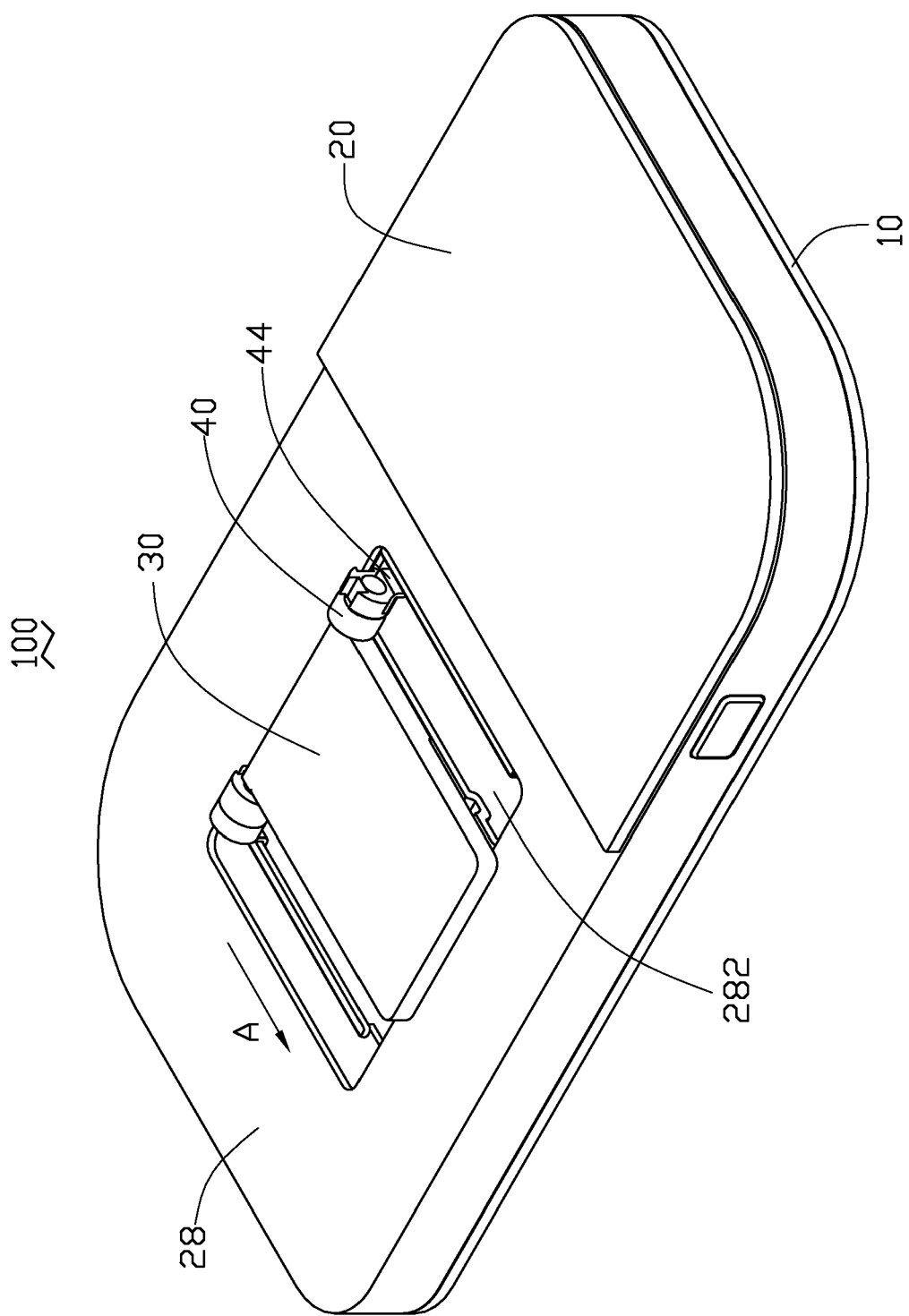
FIG. 3 is an assembled, isometric view of the electronic device shown in FIG. 2, in a stand-by position.
Figure 4:
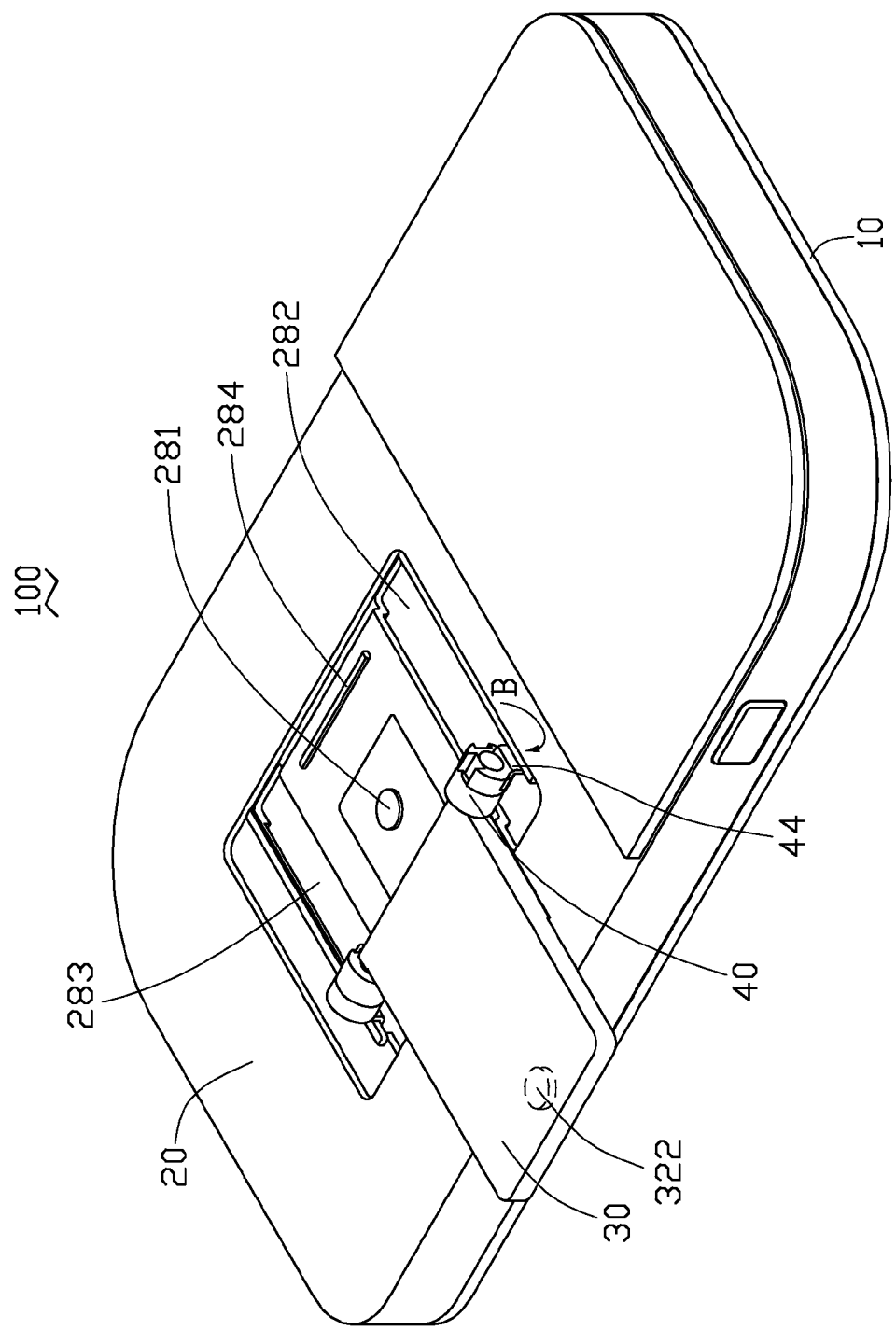
FIG. 4 is similar to FIG. 3, but in an imaging position.
Figure 5:
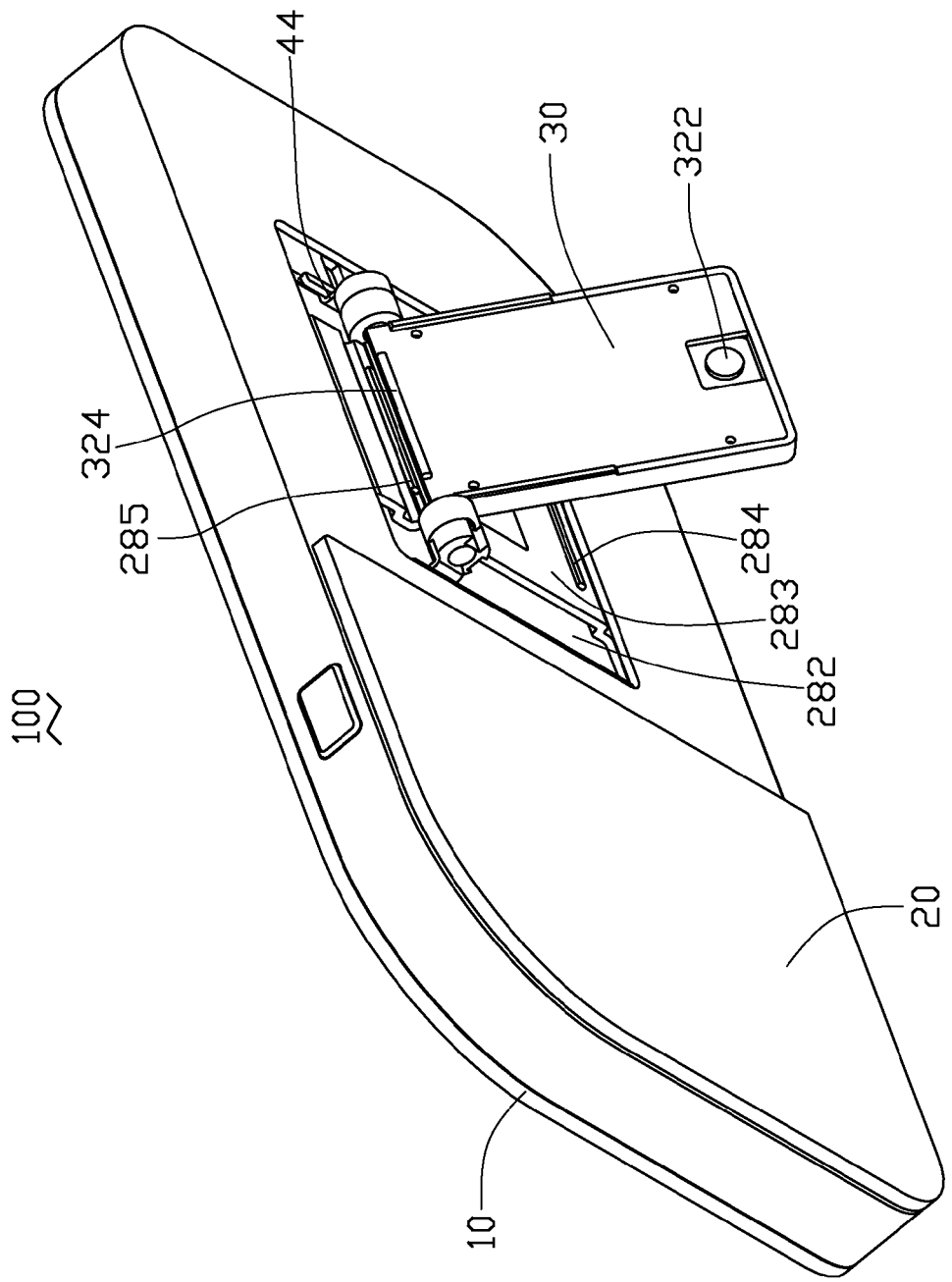
FIG. 5 is similar to FIGS. 3 and 4, but in a supporting position.

The electronic device 100 includes an upper housing 10, a lower housing 20, a sliding member 30, and two hinge assemblies 40. The upper housing 10 can be secured to the lower housing 20 (see FIG. 3). The sliding member 30 can be slidably and rotatably mounted to the lower housing 20 (FIGS. 4 and 5).

Referring to FIG. 2, the lower housing 20 includes a top wall 28 and a mounting panel 283. The top wall 28 defines a cavity 282 and two opposite sliding grooves 292 communicating with the cavity 282. The mounting panel 283 extends along the sliding grooves 292 above the cavity 282 and connects two opposite sides of the cavity 282. The first camera module 281 can be mounted near the center of the mounting panel 283. The mounting panel 283 includes a magnetic, bar-shaped first securing portion 284 at one end and a magnetic, bar-shaped second securing portion 285 at an opposite end. The first securing portion 284 and the second securing portion 285 magnetically secure the sliding member 30.

Referring to FIG. 1, the sliding member 30 is generally a rectangular panel including an upper wall 32. The second camera module 322 can be mounted to an end of the upper wall 32. The upper wall 32 has a third magnetic, bar-shaped securing portion 324 protruding from an end opposite to the second camera module 322. The sliding member 30 defines two opposite fixing grooves 325 in a side below the third securing portion 324.

Each hinge assembly 40 includes a fixing portion 42, a sliding portion 44, a driving portion 46, and a following portion 48. The hinge assemblies 40 can be fixed to the sliding member 30 to facilitate sliding and rotating of the sliding member relative to the lower housing 20.

Each fixing portion 42 projects from a side surface of the driving portions 46 and is configured to securely engage into (e.g., by threadingly fixing) the corresponding fixing groove 325. Each sliding portion 44 projects from a side surface of the following portions 48 opposite to the fixing portion 42, and is configured to slidably engage into the sliding groove 292. The driving portions 46 are configured to rotatably engage with the following portions 48, and can maintain an opened position and a closed position relative to the following portions 48.

The electronic device 100 can be operated to move between three positions, i.e., a stand-by position (shown in FIG. 3), an imaging position (shown in FIG. 4), and a supporting position (shown in FIG. 5). Referring to FIGS. 1, 2 and 3, in the stand-by position, the first securing portion 284 magnetically attracts/secures the third securing portion 324. The attraction secures the engaging of the sliding portions 44 into the sliding grooves 292. Thus, the sliding member 30 is secured parallel with the top wall 28 to cover the mounting panel 283. Therefore, the sliding member 30 shields/covers the first camera module 281, and the mounting panel 283 shields/covers the second camera module 322. The first camera module 281 and the second camera module 322 are simultaneously hidden within the electronic device 100.

To change the electronic device 100 from the stand-by position to the imaging position, the sliding member 30 may be pushed to slide relative to the mounting panel 283 along arrow A (seen in FIG. 3). The first securing portion 284 overcomes the magnetic attraction to detach from third securing portion 324. Referring also to FIG. 4, the sliding portions 44 slide along the sliding grooves 292 to expose the first camera module 281 and the second camera module 322 out from the sliding member 30 and the mounting panel 283, respectively. At this time, the first camera module 281 and the second camera module 322 can be operated to photograph or video recording, etc. In the imaging position, the second securing portion 285 magnetically attracts the third securing portion 324. The attraction secures the sliding member 30 relative to the mounting panel 283.

To convert the electronic device 100 from the imaging position to the supporting position, the sliding member 30 can be rotated relative to the mounting panel 283 along arrow B (seen in FIG. 4). The third securing portion 324 rotates relative to the second securing portion 285 by overcoming the magnetic attraction. The rotation of the sliding member 30 drives the driving portion 46 to rotate around the following portion 48 until the driving portion 46 maintains its opened position relative to the following portion 48 (see FIG. 5). At this time, the sliding member 30 maintains an acute angle at the mounting panel 283. Thus, the sliding member 30 can be used to support the electronic device 100 e.g., on a desk.

The above-described process can be reversed for shielding the first camera module 281 and the second camera module 322 within the electronic device 100.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device, comprising:
a lower housing comprising a mounting panel;
a sliding and pivoting member mounted to the lower housing;
a first camera module mounted to the mounting panel and configured to be covered by the sliding and pivoting member;
a second camera module mounted to the sliding and pivoting member, the second camera module configured to be facing towards the first camera module when the sliding and pivoting member is in a closed position; and
two hinge assemblies fixed to the sliding and pivoting member and configured for enabling the sliding and pivoting member to linearly slide relative to the lower housing to expose the first camera module and to move the second camera module into an exposed position, and the hinge assemblies further configured to enable the sliding and pivoting member to pivotably rotate relative to the lower housing to a direction facing away from the first camera module.

2. The electronic device as claimed in claim 1, wherein the mounting panel forms a first securing portion and a second securing portion, the sliding member forms a third securing portion, and the third securing portion is configured to secure the first securing portion and the second securing portion.

3. The electronic device as claimed in claim 2, wherein the first securing portion, the second securing portion and third securing portion magnetically attract each other.

4. The electronic device as claimed in claim 2, wherein the lower housing defines two sliding grooves, the hinge assemblies each comprises a sliding portion, and the sliding portions slidably engage the sliding grooves.

5. The electronic device as claimed in claim 4, wherein the mounting panel extends along and is located between the sliding grooves, the first camera module is located between the first securing portion and the second securing portion, the second camera module and the third securing portion are located at two opposite ends of the sliding member.

6. The electronic device as claimed in claim 4, wherein the hinge assembly further comprises a fixing portion configured to fix the hinge assembly to the sliding member.

7. The electronic device as claimed in claim 6, wherein the sliding member defines two fixing grooves, the fixing portions configured to be secured into the fixing grooves.

8. The electronic device as claimed in claim 6, wherein the hinge assembly further comprises a driving portion and a following portion, and the driving portion is configured to rotatably engage with the following portion and maintain an opened position and a closed position relative to the following portion.

9. The electronic device as claimed in claim 8, wherein the fixing portion projects from the driving portion, the sliding portion projects from the following portion, and the fixing portion is opposite to the sliding portion.

10. An electronic device having a stand-by position, an imaging position and a supporting position, comprising:
a lower housing comprising a mounting panel;
a first camera module mounted to the mounting panel;
a sliding and pivoting member mounted to the lower housing;
a second camera module mounted to the sliding and pivoting member; and
two hinge assemblies fixed to the sliding and pivoting member, wherein:
in the stand-by position, the first camera module and the second camera module are hidden within the lower housing, the second camera module facing towards the first camera module;
from the stand-by position to the imaging position, the sliding and pivoting member linearly slides relative to the lower housing to expose the first camera module and the second camera module; and
from the imaging position to the supporting position, the sliding and pivoting member is pivotably rotated relative to the lower housing to a direction facing away from the first camera module to support the lower housing.

11. The electronic device as claimed in claim 10, wherein the mounting panel forms a first securing portion and a second securing portion, the sliding member forms a third securing portion, and the third securing portion is configured to secure the first securing portion and the second securing portion.

12. The electronic device as claimed in claim 11, wherein the first securing portion, the second securing portion and third securing portion magnetically attract with each other.

13. The electronic device as claimed in claim 11, wherein the lower housing defines two sliding grooves, each hinge assembly comprises a sliding portion, and the sliding portions slidably engage into the sliding grooves.

14. The electronic device as claimed in claim 13, wherein the mounting panel extends along and is located between the sliding grooves, the first camera module is located between the first securing portion and the second securing portion, the second camera module and the third securing portion are located at opposite ends of the sliding and pivoting member.

15. The electronic device as claimed in claim 13, wherein the hinge assembly further comprises a fixing portion configured to fix the hinge assembly to the sliding member.

16. The electronic device as claimed in claim 15, wherein the sliding member defines two fixing grooves, the fixing portions configured to secured into the fixing grooves.

17. The electronic device as claimed in claim 15, wherein the hinge assembly further comprises a driving portion and a following portion, and the driving portion is configured to rotatably engage with the following portion and maintain an opened position and a closed position relative to the following portion.

18. The electronic device as claimed in claim 17, wherein the fixing portion projects from the driving portion, the sliding portion projects from the following portion, and the fixing portion is opposite to the sliding portion.

* * * * *